(12) United States Patent
Goni Usabiaga

(10) Patent No.: US 6,446,660 B1
(45) Date of Patent: Sep. 10, 2002

(54) VALVE ASSEMBLY WITH MULTIPLE MODE ACTUATORS

(75) Inventor: Juan Jose Goni Usabiaga, Beasain (ES)

(73) Assignee: Ampo, S. Coop., Idiazabel (ES)

( * ) Notice: Subject to any disclaimer, the term of this patent is extended or adjusted under 35 U.S.C. 154(b) by 0 days.

(21) Appl. No.: 09/791,095

(22) Filed: Feb. 22, 2001

(51) Int. Cl.⁷ .......................... F16K 31/04; F16K 31/50; F16K 31/53
(52) U.S. Cl. .................. 137/243.6; 74/89.13; 74/89.16; 74/89.23; 74/89.29; 74/424.71; 74/665 Q; 251/129.11; 251/248; 251/249.5; 251/267
(58) Field of Search .............................. 137/243.6, 331, 137/15.18; 74/89.23, 89.29, 424.71, 89.13, 89.14, 89.16, 724, 665 Q; 251/129.11, 129.12, 129.13, 248, 249.5, 264, 266, 267

(56) References Cited

U.S. PATENT DOCUMENTS

| 2,177,265 A | 10/1939 | Rath | 251/29 |
|---|---|---|---|
| 3,220,431 A | 11/1965 | Morrell | 137/243.6 |
| 3,311,121 A | * 3/1967 | Morrell | 137/243.6 |
| 3,505,888 A | 4/1970 | Denkowski | 74/89.15 |
| 3,738,183 A | * 6/1973 | Ball, Jr. et al. | 251/129.12 |
| 4,338,961 A | * 7/1982 | Karpenko | 137/331 |
| 4,346,728 A | 8/1982 | Sulzar | 137/243.6 |
| 4,350,322 A | * 9/1982 | Mueller | 251/249.5 |
| 4,460,009 A | * 7/1984 | Nanci et al. | 137/243.6 |
| 4,465,091 A | 8/1984 | Keller | 137/243.6 |
| 4,760,989 A | 8/1988 | Elliott et al. | 251/129.03 |

\* cited by examiner

Primary Examiner—George L. Walton
(74) Attorney, Agent, or Firm—Larkin, Hoffman, Daly & Lindgren, Ltd.; Frederick W. Niebuhr

(57) ABSTRACT

A multiple mode valve assembly including valve actuators equipped with a combination of a shaft (4) and a spindle (5), coaxial and immobilized in an axial direction, but capable of rotating freely one with respect to the other, so that by means of the spindle (5), through a threaded nut assembly (6) and the pertinent motor (9), the longitudinal displacement of the gate (3) is produced in valve opening and shutting operations, whilst by means of direct application of a rotary movement to the shaft (4), which does not affect the spindle (5), from a second motor (23), the gate (3) turns on the valve seat (2), in the shut position, producing a friction effect and consequent self-cleaning of the seal.

30 Claims, 1 Drawing Sheet

VALVE ASSEMBLY WITH MULTIPLE MODE ACTUATORS

FIELD OF THE INVENTION

The present invention relates generally to a valve assembly having valve actuators and, more particularly, to valve actuators which provide for both rotational and axial translational movements of a valve stem. Yet more particularly, the invention relates to a valve for use in aggressive applications, such as alumina production facilities, which includes self-cleaning means toward assuring proper fit and seal between the valve gate and its corresponding seat.

BACKGROUND OF THE INVENTION

In many applications it is desirable to have the ability to move the stem of a valve in two manners, axially and rotationally. For example, in some industrial applications it is desirable when closing the valve to first move the valve stem axially so that the valve gate contacts the valve seat and then to rotate the valve stem so the valve gate grinds against the seat to remove any buildup of deposited material which may have otherwise acted to prevented a complete closing of the valve.

Valves for use in aluminum manufacturing facilities have been particularly subject to bauxite buildup between the valve gate and valve seat. Generally speaking these valves have an elbow-shaped construction, in such a manner that the valve gate is extended on a shaft which traverses the valve body and is terminated in a spindle having a complementary threaded nut element, so that said threaded nut element, through whatever means of conventional operation, provides the spindle with the necessary axial motion for carrying out valve opening/closing.

Conventionally the periodical cleaning of such valves has been carried out by hand, after valve dismantlement, which clearly involves an interruption in the process of producing alumina, with the consequent repercussion that this implies.

Publication WO 99/61829 purportedly discloses a valve seat self-cleaning device having a blocking collar capable of being manually coupled to and decoupled from the valve assembly. Through said collar and with the valve in a shut position, the nut and the spindle could be blocked, with an accompanying release of the spindle in the angular sense so that the rotary movement applied to the nut, instead of being converted into an axial displacement of the spindle, was directly transmitted to said spindle. As a result the gate, instead of being retracted with respect to the valve seat, is rotated with respect to the latter producing a friction effect and the consequent elimination of bauxite deposits or scale, i.e. a valve self-cleaning effect was obtained, without the need to proceed to the dismantling of the valve body. However this valve assembly in addition to requiring a manual intervention for the coupling/decoupling of the blocking collar, meant that in a situation of keying of the nut to the spindle (that is, in the cleaning phase), the spindle could not be advanced. As a result, the duration of the cleaning operation became longer as the depth of the scale became deeper, since after a first friction application, in which the surface layer of the scale was removed, the friction effect between gate and seat likewise disappeared, it being necessary to dismantle the blocking collar, re-adjust the gate to the seat and re-couple the blocking collar. In some instances it even being necessary for the operation to be repeated several times, depending on the depth of the scaling.

SUMMARY OF THE INVENTION

The present invention provides a multiple mode valve actuator structure for controlling the operation of a valve and providing for axial and/or rotational movement of the valve gate relative to the valve seat. In one embodiement, the valve includes a partially threaded valve stem spindle engaging a threaded nut element to provide for axial movement of the valve stem. The apparatus includes a first drive motor which is activated during the first mode of valve actuator operation (axial movement). A first crown gear drive assembly operatively couples the first drive motor to the valve stem via an intermediate spindle. A second drive motor, which is activated during the second mode of valve actuator operation (rotational movement) is operatively coupled to the valve stem via a second crown gear drive assembly and stem engagement structure. During the first mode of valve actuator operation, the valve stem is axially driven by the first gear drive assembly, through a threaded nut element engaging a threaded valve stem spindle. During a second mode of operation, both gear drive assemblies are driven to both rotate and axially transition the valve stem. A control device may be provided to control the mode of operation of the valve actuator. The first and second drive motors may be driven in multiple modes separately for independent axial or rotational movement of the stem, or simultaneously for axial and rotational movement of the stem.

A particular valve according to the present invention for alumina production plants is based on the principle of self-cleaning through friction, by rotation of the gate against the valve seat permitting complete automation of the cleaning process.

To this end, in a more specific way and based on a conventional valve body with its pertinent valve seat and gate, the latter in association with a shaft capable of undergoing a movement of axial displacement by means of a spindle-nut mechanism, the valve of the invention centers its characteristics on the fact that in said spindle two coaxial sectors are established, one constituting the spindle itself, axially displaceable with the collaboration of the corresponding and aforesaid nut, and another constituting the gate supporting shaft, with the particularity that these two elements, shaft and spindle, are inter-coupled with the assistance of a sleeve which, immobilising one with respect to the other in the axial sense, permits however the free rotation of the shaft with respect to the spindle.

Complementing the structure described the sleeve mentioned is conveniently keyed to another external sleeve, through which the internal sleeve and consequently the shaft to which the gate is joined and the gate itself, can undergo a rotation without the latter affecting the spindle, whereby the latter can turn freely with respect to the shaft.

However, a key that couples the two sleeves mentioned lies in a groove in one of the sleeves, preferentially the internal sleeve, of sufficient length to permit the relative axial movement between the two sleeves corresponding to the change from one of the limiting positions to the other of the gate with respect to the valve seat.

In accordance with another of the characteristics of the invention, both the nut corresponding to the spindle, and the external sleeve that transmits the rotary movement to the gate, each have a toothed crown gear, said gears being operable by means of bevel pinions, through respective reduction gear motors, electrical or hydraulic, in such a manner that the operation of one of them shall produce the valve opening-shutting action, and the operating of the other shall produce the rotary movement of the gate with respect to its seat, it being clear that both motors can work simultaneously, in such a manner that in the cleaning phase and as the scale is progressively removed by friction from the gate and from the valve seat, said gate shall gradually progress towards the seat, in order that this self-cleaning phase does not lose its efficacy.

DESCRIPTION OF THE DRAWINGS

To complement this description and in order to assist in a better understanding of the characteristics of the invention, in accordance with a practical embodiment thereof, a single drawing sheet is attached forming an integral part of said description, the single figure on said drawing sheet being by way of illustration and not restrictive in nature, showing, according to a side elevation and in diametric cross section, a valve for alumina producing plants implemented in accordance with the purpose of the present invention, said valve appearing in the shut position.

PREFERRED EMBODIMENT OF THE INVENTION

Figure 1:
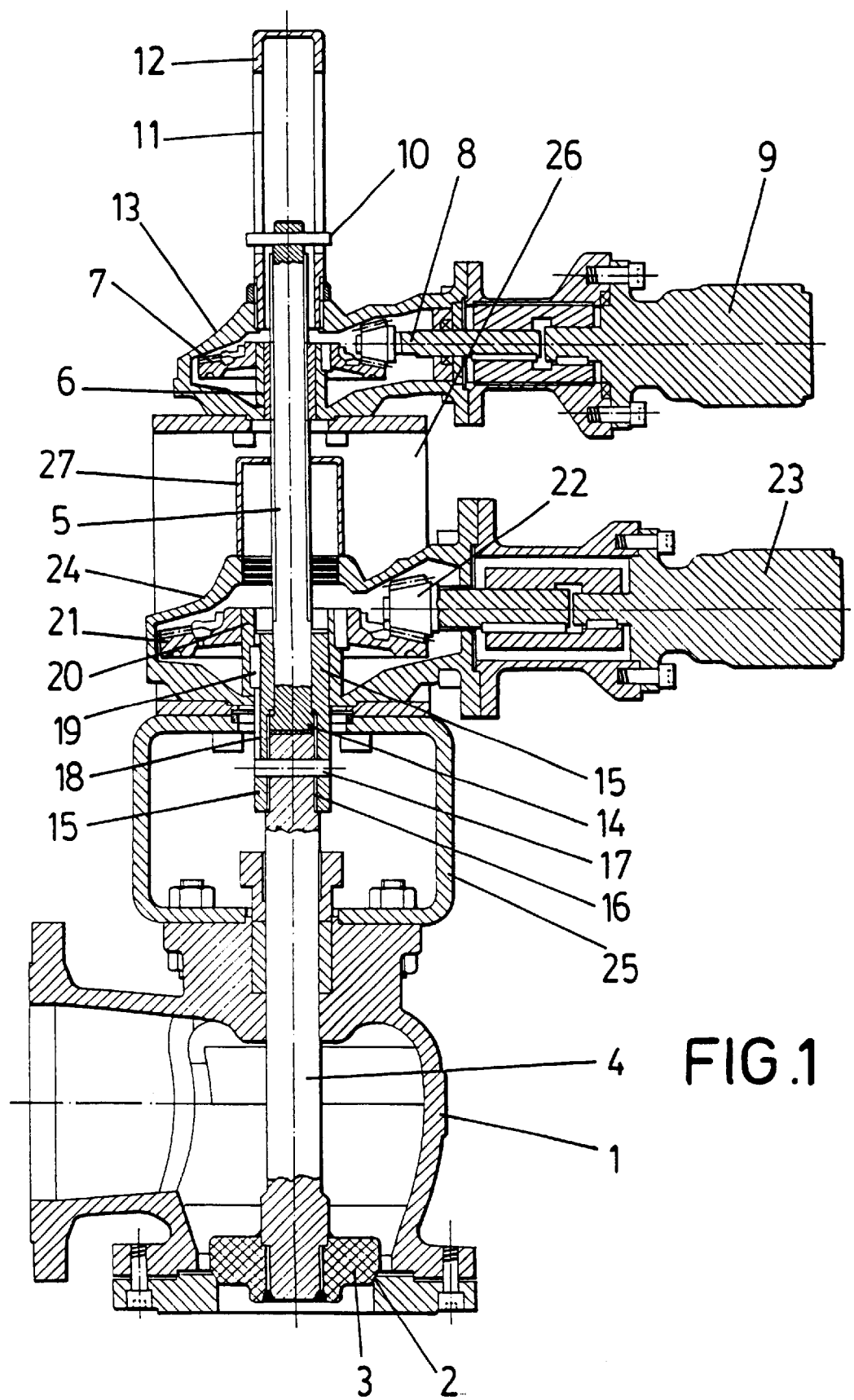
FIG. 1 is a sectional view of a preferred embodiment of the present invention.

Referring to FIG. 1, it may be seen that the valve assembly according to the present invention includes a valve body (1) in which is formed a valve seat (2) on which a gate (3) acts. The gate (3) is coupled to a valve stem or shaft (4), which is axially displaceable by the action of a spindle (5). Spindle (5) is axially raised or lowered by action of a threaded nut element (6) which is coupled to a toothed crown wheel or gear (7) and a bevel pinion (8), receiving the movement of a reduction gear motor (9). The threaded nut element (6) engages corresponding threaded elements on the spindle (5), so that as the threaded nut element (6) is rotated by the gear motor (9), the spindle (5) is raised or lowered dependent on the direction of motor (9). As a result, the rotation of said reduction gear motor (9) in a predetermined direction produces the axial separation of the gate (3) with respect to the valve seat (2) and its turning in the opposite direction produces similarly in the opposite direction the operation corresponding to closing the gate (3) against the seat (2).

The spindle (5), for axial movement of the gate (3), includes a pair of ends. A first free end of the spindle (5) includes a diametric pin (10), the ends of which are received within grooves (11) operationally formed in a hood (12) extension of the casing (13). As a result, the pin (10) and groove (11) cooperate to allow axial movement of the spindle (5) without permitting rotational movement thereof relative to the valve body (1).

The casing (13) houses the crown wheel (7) and the transmission pinion (8). The grooves (11) receive and limit the movement of the pin (10), and thus define the upper and lower limits of movement of gate (3). Spindle (5) includes another end, opposite the free end, which includes a small enlargement (14) by means of which the spindle (5) is rigidly axially coupled with respect to an intermediate sleeve (15). In an axial movement, the intermediate sleeve (15) operatively couples the spindle (5) with respect to the shaft (4). As described hereinafter, the intermediate sleeve (15) freely rotates relative to the spindle (5), i.e., the spindle (5) is axially, but not rotationally coupled to the sleeve (15).

The sleeve (15) acts as a rotational driving element for the shaft (4). The sleeve (15) is coupled to the shaft (4) by a screw thread (16) and a diametric pin (17). The sleeve (15) has a groove (18) in which sleeve runs a key (19). Together the groove (18) and key (19), by permitting the free axial displacement of the sleeve (15), and consequently the free axial displacement of the assembly formed by the shaft (4) and the spindle (5), immobilise in an angular direction said sleeve (15) with respect to an external sleeve (20). In turn, the external sleeve (20) is coupled to a toothed crown gear (21), similar to the aforementioned crown gear (7) which, through another bevel pinion (22), receives the movement of a second reduction gear motor (23), also similar to the reduction gear motor (9). This second transmission (21–22) is housed likewise in a casing (24) similar to the casing (13), the assembly of these elements being facilitated through the collaboration of brackets (25) and (26), coupled to each other and coupled to the valve body (1) itself. A dust guard cover (27) protects the transmission (21–22) mentioned, while permitting the necessary axial displacement of the sleeve (15).

In accordance with this construction and through the reduction gear motor (9), the axial displacement operations for opening and shutting the valve are performed on the gate (3), to which end said reduction gear motor (9) can be controlled by appropriate means.

When it is periodically necessary to carry out a valve self-cleaning operation, the reduction gear motor (23) is brought into operation, preferably also in an automatic way, to rotate the valve gate (3) relative to the valve seat (2). During this process, the reduction gear motor (9) is brought into operation to position the gate (3) on the valve seat (2) whilst the upper spindle (5) is held immobile. The combination of an axial gate force and the rotational movement of the gate (3) relative to the seat (2) produces the intended friction effect of the gate (3) against the valve seat (2) to achieve a progressive rubbing away of the deposits or scale present in the contact zones between the gate (3) and valve seat (2).

In one application of the present invention, the valve gate (3) may be axially seated against the valve seat (2) by the drive motor (9) without a rotational movement thereof. Intermittently or continuously, as controlled by a remote controller, etc., the valve gate (3) may be rotated by the drive motor (23) relative to the valve seat (2) to produce the desired cleaning effect.

In another application of the present invention, the valve gate (3) may be axially and rotationally seated against the valve seat (2) by activation of both gear motors (9) and (23). Control of the gear motors (9) and (23) could be made through known motor control systems, devices, or applications (not shown) as appreciated by those skilled in the relevant arts.

It should be appreciated that the gate (3) may be placed in variable axial contact against valve seat (2) by the drive motor (9), spindle (5), and threaded nut assembly (6). It should further be appreciated that the gate (3) may be rotated relative to the valve seat (2) by a variable speed, dependent on the speed of motor (23).

It should be further appreciated that the drive motors (9) and (23) may be remotely disposed from the valve body (1) and operatively coupled to the bevel drive gears (7) and (21) through known power transmission applications. Additionally, alternative power transmission strategies would be appreciated to replace or supplement the pinion and bevel gear combinations of the illustrated preferred embodiment, e.g., sun gear structures, etc.

It is understood, therefore, that this invention is not limited to the particular embodiment disclosed, but it is intended to cover all medications, which are within the scope and spirit of the invention as defined by the appended claims.

What is claimed is:

1. A multiple mode valve assembly, comprising:
   a valve body defining a valve seat;
   a displaceable valve gate received within the valve body and adapted to cooperate with the valve seat to form a seal;
   a valve shaft having a pair of ends including a first end coupled to the valve gate and a second end relatively remote from the valve gate, said valve shaft being movable axially to axially displace the valve gate relative to the valve seat, and rotatable to rotationally displace the valve gate relative to the valve seat;
   a spindle element having a pair of ends, said spindle element rotatably coupled with respect to the second end of the valve shaft; said spindle element being coupled with respect to the valve body in a manner to prevent any substantial rotation of the spindle element relative to the valve body;
   a first drive motor coupled with respect to the valve body and operatively coupled to the spindle element to axially displace the spindle element and the valve shaft relative to the valve seat to alternatively open and close said valve gate; and
   a second drive motor coupled with respect to the valve body and operatively coupled to the valve shaft to rotate the valve shaft and the valve gate relative to the valve seat independently of any rotation of said spindle to allow a cleaning action between said valve gate and said valve seat.

2. A valve assembly of claim 1 wherein the shaft and the spindle are coupled to each other through a common sleeve, said common sleeve permitting a free rotation of the shaft relative to the spindle.

3. A valve assembly of claim 2 wherein the common sleeve has a groove which cooperates with a key in association with a second sleeve surrounding the common sleeve and coupled to a crown gear driven by the second drive motor.

4. A valve assembly of claim 1 wherein the first drive motor is operatively coupled to the spindle element through a pinion and a crown gear.

5. A valve assembly of claim 1 wherein the second drive motor is operatively coupled to the valve shaft through a pinion and a crown gear.

6. A valve assembly of claim 1 wherein the spindle element is coupled to the valve body through a diametric pin confined within a groove of the valve body.

7. A valve assembly of claim 1 wherein the first drive motor and the second drive motor are independently operable to impart a combination of axial and rotational movement to the valve gate.

8. A multiple mode valve assembly, comprising:
   a valve body defining a valve seat;
   a displaceable valve gate received within the valve body and cooperating with the valve seat to form a seal;
   a first valve displacement element coupled to the valve gate, said first valve displacement element for axially displacing the valve gate relative to the valve seat, and for rotationally displacing the valve gate relative to the valve seat;
   a second valve displacement element rotatably coupled with respect to the first valve displacement element, said second valve displacement element being coupled to the valve body in a manner to prevent any substantial rotation of the second valve displacement element relative to the valve body;
   a first drive motor coupled to the valve body and operatively coupled to the first valve displacement element to rotate the first valve displacement element relative to the valve seat independently of any rotation of said second valve displacement element to allow a cleaning action between said valve gate and said valve seat; and
   a second drive motor coupled to the valve body and operatively coupled to the second valve displacement element to axially displace the first valve displacement element and the second valve displacement element relative to the valve seat to alternatively open and close said valve gate.

9. A valve assembly of claim 8 wherein the first valve displacement element and the second valve displacement element are coupled to each other through a common sleeve, said common sleeve permitting a free rotation of the first displacement element relative to the second valve displacement element.

10. A valve assembly of claim 9 wherein the common sleeve has a groove which cooperates with a key in association with a second sleeve surrounding the common sleeve and coupled to a crown gear driven by the first drive motor.

11. A valve assembly of claim 8 wherein the first drive motor is operatively coupled to the first valve displacement element through a pinion and a crown gear.

12. A valve assembly of claim 8 wherein the second drive motor is operatively coupled to the second valve displacement element through a pinion and a crown gear.

13. A valve assembly of claim 8 wherein the second valve displacement element is non-rotatably coupled to the valve body through a diametric pin confined within a groove of the valve body.

14. A valve assembly of claim 8 wherein the first drive motor and the second drive motor are independently operable to impart a combination of axial and rotational forces to the valve gate.

15. A valve assembly of claim 8 wherein the first valve displacement element is a shaft having a first end and second end.

16. A valve assembly of claim 15 wherein the second valve displacement element is a spindle having a first end and second end.

17. A valve assembly of claim 16 wherein the shaft is coupled at the first end to the spindle and to the valve gate at the second end.

18. A valve assembly of claim 16 wherein the spindle is rotatably coupled to the shaft at the first end and operatively coupled proximate the second end to the second drive motor.

19. A method of operating a valve assembly, said method including the steps of:
   providing a valve body including a valve seat;
   providing a displaceable valve gate received within the valve body and cooperating with the valve seat to form a seal;
   providing a first valve displacement element coupled to the valve gate, for axially displacing the valve gate relative to the valve seat, and rotationally displacing the valve gate relative to the valve seat;
   providing a second valve displacement element, said second valve displacement element rotatably coupled to the first valve displacement element and non-rotatably coupled to the valve body;
   providing a first drive motor coupled to the second valve displacement element to axially displace the second valve displacement element and the first valve displacement element relative to the valve seat to alternatively open and close said valve gate;

providing a second drive motor coupled to the first valve displacement element to rotate the first valve displacement element so that the valve gate rotates relative to the valve seat independently of any rotation of the second valve displacement element; and operating the first drive motor and the second drive motor to axially and rotationally displace the valve gate relative to the valve seat to impart a frictional force between the valve gate and valve seat, said frictional force removing debris from between the valve gate and the valve seat.

20. The method of claim 19, wherein the first drive motor is independently operable relative to the second drive motor to axially displace the valve gate without rotational movement between the valve gate and the valve seat.

21. A multiple mode valve assembly, comprising:

a valve body defining a valve seat;

a displaceable valve gate received within the valve body and cooperating with the valve seat to form a seal;

a first valve displacement element coupled to the valve gate, adapted for axially displacing the valve gate relative to the valve seat, and rotationally displacing the valve gate relative to the valve seat;

a second valve displacement element rotatably coupled to the first valve displacement element; said second valve displacement element being coupled to the valve body in a manner to prevent any substantial rotation of the second valve displacement element relative to the valve body;

a first drive element operatively coupled to the first valve displacement element to rotationally displace the first valve displacement element relative to the valve seat independently of any rotation of said second valve displacement element to allow a cleaning action between said valve gate and said valve seat; and a second drive element operatively coupled to the second valve displacement element to axially displace the first valve displacement element and the second valve displacement element relative to the valve seat to alternatively open and close said valve gate.

22. A valve assembly of claim 21 wherein the first drive element includes a drive motor coupled to the valve housing.

23. A valve assembly of claim 22 wherein the second drive element includes a drive motor coupled to the valve housing.

24. A valve assembly of claim 23 wherein the first drive motor and the second drive motor are independently operable to impart a combination of axial and rotational forces to the valve gate.

25. A self-cleaning valve arrangement, including:

a valve body defining a valve seat;

a valve gate;

a valve shaft integral with the valve gate and extending away from the valve gate in an axial direction; and a spindle coaxial with the valve shaft, extending away from the valve shaft in said axial direction, and coupled with respect to the valve shaft in a manner that permits rotation of the spindle relative to the valve shaft while preventing any substantial axial travel of the spindle relative to the valve shaft to perform a cleaning action when the valve gate is moved adjacent to or into engagement with said valve seat;

whereby the spindle is movable axially relative to the valve body to so move the valve shaft, and thereby move the valve gate axially toward and away from a seating against the valve seat to alternatively close and open flow communication through the valve body; and whereby said valve shaft and said valve gate are rotatable in concert relative to the valve body, independently of the spindle and any spindle rotation.

26. The valve arrangement of claim 25 wherein:

the spindle is coupled with respect to the valve body in a manner that prevents any substantial rotation of the spindle relative to the valve body.

27. The valve assembly of claim 26 further including:

an internally threaded nut surrounding the spindle, rotatable relative to the valve body and substantially axially fixed relative to the valve body, the spindle having external threads for engaging the internally threaded nut whereby the spindle travels axially relative to the valve body in response to rotation of the threaded nut.

28. The valve arrangement of claim 25 further including:

a first drive motor operatively coupled to the valve shaft for rotating the valve shaft relative to the valve body, and a second drive motor operatively coupled to the spindle to move the spindle axially relative to the valve body.

29. The valve assembly of claim 25 further including:

a first sleeve fixed to the valve shaft, rotatably coupled to the spindle, and mounted to slide axially within the valve body.

30. The valve arrangement of claim 29 further including:

a second sleeve surrounding the first sleeve, axially slidable and rotatably fixed relative to the first sleeve, and rotatable relative to the valve body to rotate the first sleeve and the valve shaft.

\* \* \* \* \*